May 1, 1934.  A. KINDELMANN ET AL  1,957,171
FRAMING HANDLE CONSTRUCTION
Filed Jan. 16, 1931   3 Sheets-Sheet 1
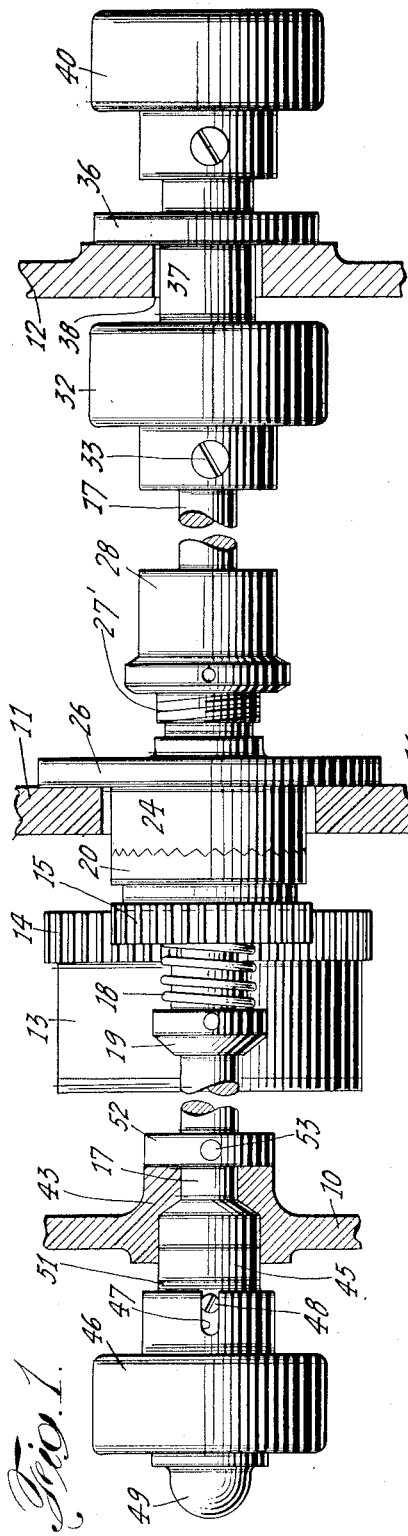
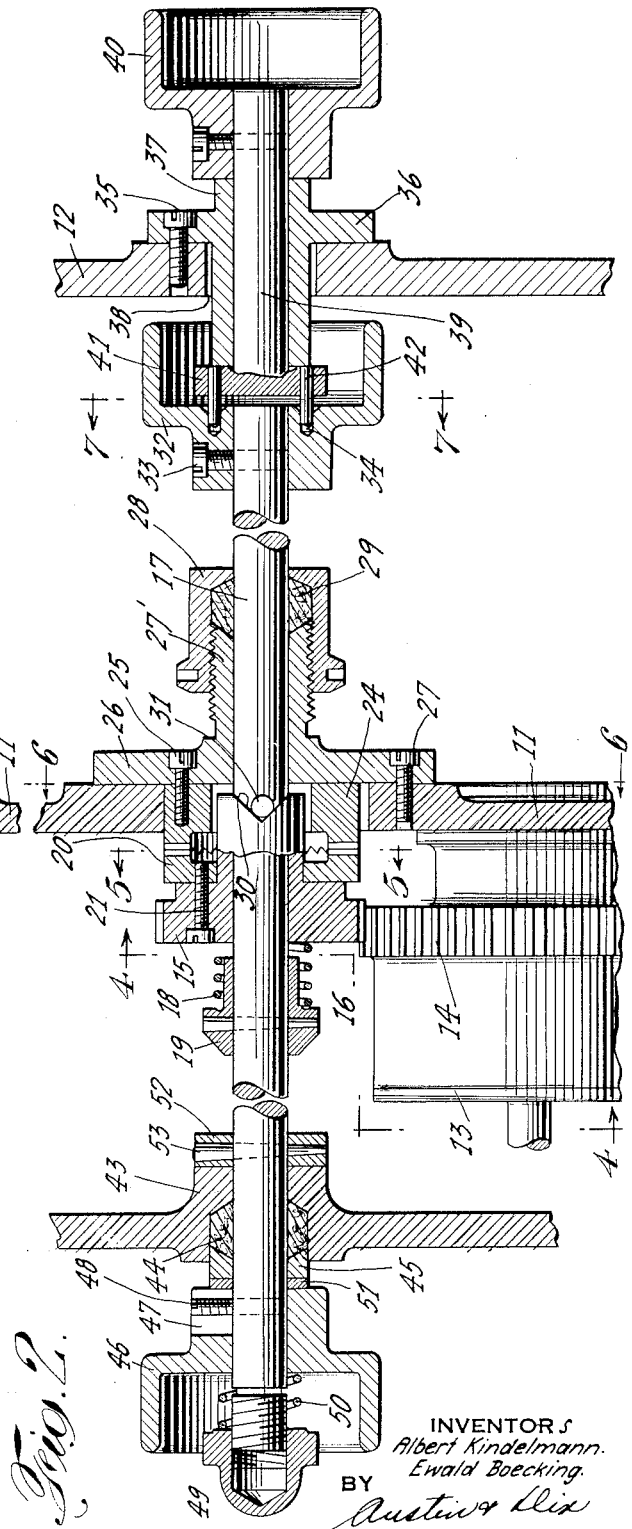
INVENTORS
Albert Kindelmann.
Ewald Boecking.
BY
ATTORNEYS

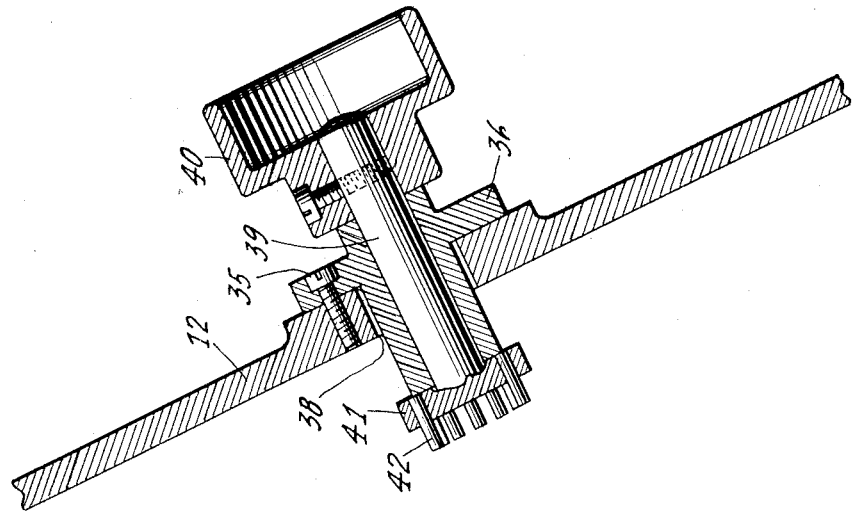
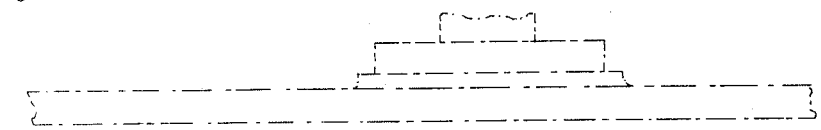
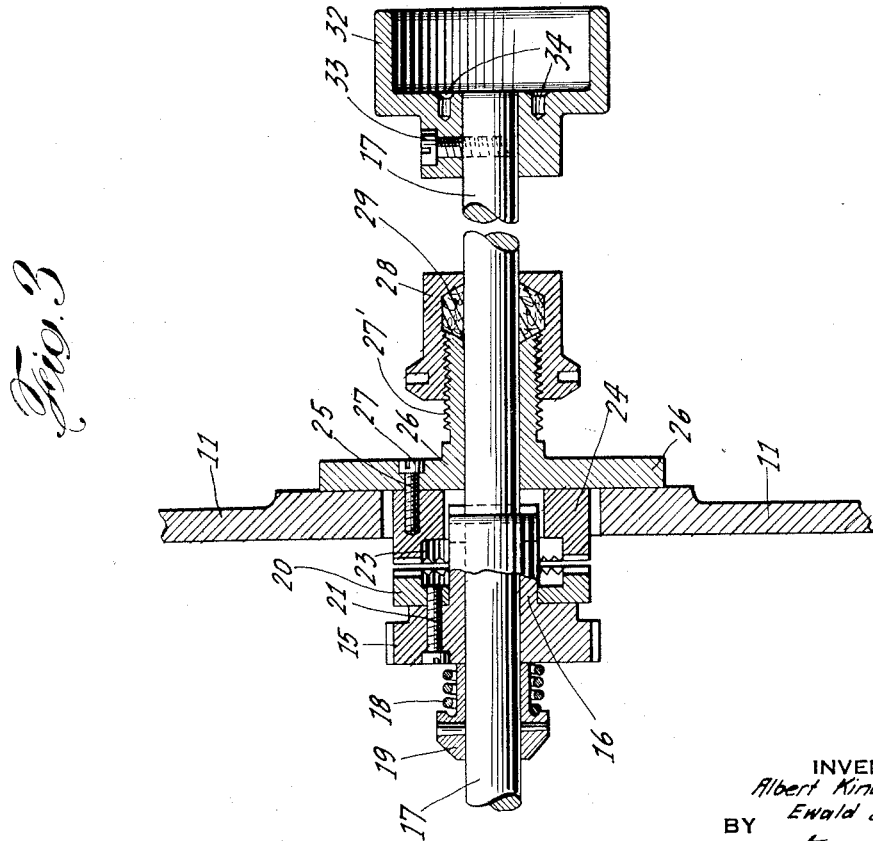

May 1, 1934.  A. KINDELMANN ET AL  1,957,171
FRAMING HANDLE CONSTRUCTION
Filed Jan. 16, 1931   3 Sheets-Sheet 3
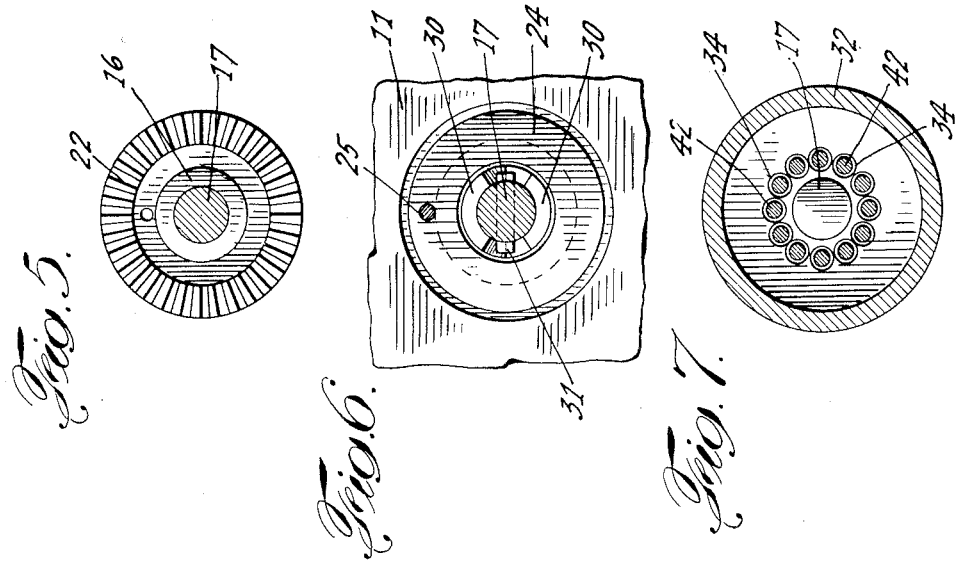
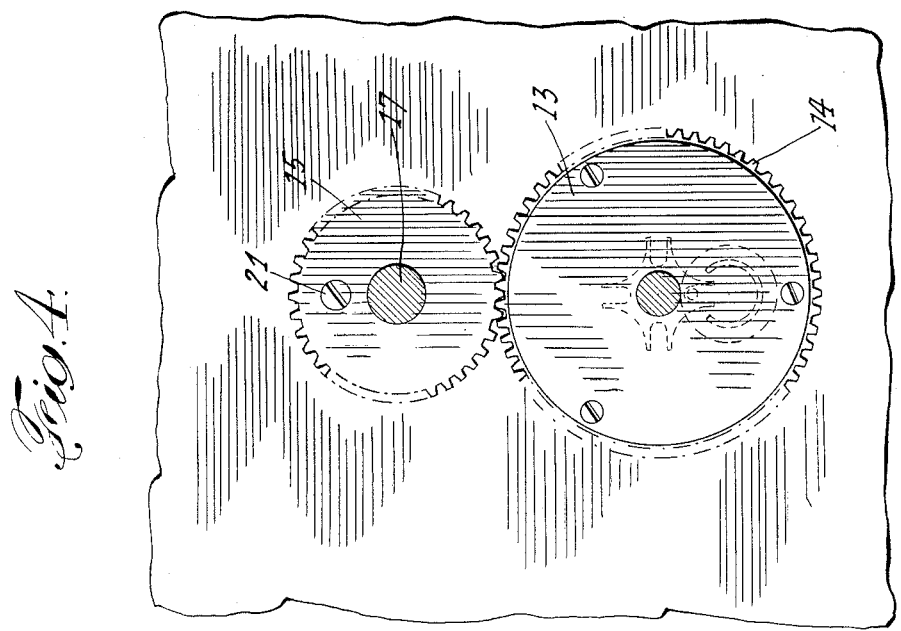
INVENTORS
Albert Kindelmann.
Ewald Boecking.
BY
Austin & Dix
ATTORNEYS Patented May 1, 1934

1,957,171

UNITED STATES PATENT OFFICE 1,957,171

FRAMING HANDLE CONSTRUCTION

Albert Kindelmann, Floral Park, and Ewald Boecking, Brooklyn, N. Y., assignors to International Projector Corporation, New York, N. Y., a corporation of Delaware Application January 16, 1931, Serial No. 509,092

7 Claims. (Cl. 88—17)

This invention relates to new and useful improvements in the construction of improved framing mechanisms for motion picture apparatus, particularly projectors, and has special reference to the construction and operation of a framing shaft therein.

A main object of the invention is to provide a simple and efficient construction whereby the operator of the machine may manipulate and adjust the framing mechanism by means of the shaft from either side of the machine whether the door is open or closed, and by a simple turn of the shaft can effect the adjustment.

A further object is to provide simple and efficient means whereby the shaft will automatically assume its normal axial position when released and simultaneously be latched in the adjusted position, so as to hold the framing mechanism as desired, until further adjustment is needed.

Further and more specific objects, features and advantages will more clearly appear from a consideration of the specification hereinafter taken in connection with the accompanying drawings which form part of the specification and which illustrate a present preferred form of the invention.

Briefly considered and in general terms, the invention comprises a shaft with means at its ends for operating it and with a brake mechanism which is engageable under certain conditions to prevent the shaft from being turned. The brake member is engageable and disengageable by moving it axially and is normally held in engageable position by a spring. The operation of the shaft upon initially turning it, and the connection between the shaft and the brake mechanism is such, that the first movement of the shaft in turning it will cause the disengagement of the brake against response of the spring, and further movement of the shaft is designed to effect whatever result is desired. Preferably the shaft is used in motion picture machines for framing purposes, and one brake device is associated with a gear in mesh with a gear on the intermittent box of the projector. The initial turning of the framing shaft, in this instance, by reason of a pin and bevelled slot connection will cause the disengagement of the movable brake member from the fixed clutch member and further movement of the shaft will turn the gears to effect the framing in the usual manner. When the hand of the operator is released from the shaft the spring above-mentioned will force the brake members back into normal engagement to latch the shaft in position to restore the normal cooperative relation betwen the pin and slot.

A further feature of the invention resides in the provision of an auxiliary knob on the outside of a swingable door disposed on an auxiliary shaft, so constructed and arranged that when the door is closed, this auxiliary shaft is automatically connected to the main shaft within the casing, so that the turning of the auxiliary knob from outside of the door when the door is closed will effect this framing operation.

The present preferred form of the invention is illustrated in the drawings, of which:

Fig. 1 is a side elevational view with certain portions broken away, of the framing handle and shaft construction;

Fig. 2 is a vertical longitudinal sectional view through the construction shown in Fig. 1;

Fig. 3 is a similar section through the right hand end of the construction showing an attachable portion of the shaft in the inoperative position;

Fig. 4 is a transverse section taken on line 4—4 of Fig. 2;

Fig. 5 is a similar section taken on line 5—5 of Fig. 2;

Fig. 6 is a similar section taken on line 6—6 of Fig. 2; and

Fig. 7 is a similar section taken on line 7—7 of Fig. 2.

As shown in the drawings, the framing shaft construction with the unlocking handle is adapted for use on motion picture apparatus, especially projectors wherein it is desirable to be able to operate the shaft from either side of the machine which has the usual door, and to be able to operate the shaft when the door is closed, as well as when it is open. With this main idea in view, the construction involves a casing indicated by walls 10 and 11 with a wall 12 of a side door. Within the casing is disposed the usual oil box 13 containing the intermittent mechanism, whereby the film is intermittently advanced through the machine. This box in framing the film, as well known in the art, is adapted to be rotated the desired amount and to that end is provided with peripheral teeth 14 engaging with teeth on a gear 15. This gear is attached to or is formed integral with a sleeve 16, slidable on shaft 17 which is the main framing shaft. This shaft extends from outside the wall 10 through the wall or partition 11 to a point adjacent the inner face of door 12. A spring 18 bears against the face of the gear 15 at one end and against a lug 19 at the other end, said lug being keyed or otherwise fastened to the shaft 17. The opposite face of the gear has a brake disk 20 fastened thereto by means of screws 21. This brake disk has teeth 22 engageable with corresponding teeth 23 on a fixed brake disk or plate 24 fastened by screws 25 to a plate 26 which in turn is fastened by screws 27 to the wall or partition 11. These brake disks have central bores through which the sleeve 16 and shaft 17 extend.

The plate 26 is provided with a sleeve-like outwardly threaded extension 27' also adapted to receive and act as a bearing for shaft 17. A cup 28 is threaded into the end of this portion 27' and packing 29 is disposed therein. This packing may be oily material to properly lubricate the bearings. The end of the sleeve 16 toward the plate 26 is provided with a transverse notch 30, and a transverse pin 31 on the shaft 17 is adapted to lie in said notch. This engagement permits the shaft 17 when turned to turn the sleeve 16 and consequently the gear 15. This engagement also permits the shaft 17 as it starts to turn, as in Fig. 3, to withdraw the brake disks from engagement so that the gear 15 can be turned. This disengagement of the brake members is achieved by reason of the bevelled walls of the notch 30 being engaged by the pin 31 on the shaft 17. The initial turning of the shaft will cause the pin to engage the bevelled wall and force the sleeve 16 to the left against the action of spring 18. It will be seen that when the hand is released the spring will automatically re-engage the brake members and restore the normal relation of the pin and slot.

The right-hand end of shaft 17 is provided with a cup-like end knob 32 fastened thereto by screw 33. Within the bottom of the cup portion of this knob 32 are provided a series of holes 34 preferably arranged in a circle. Fastened by screw 35 to door wall 12 is a plate 36 having a sleeve 37 thereon extending through a bore 38 in the door. This sleeve acts as a journal for an auxiliary shaft 39. The outer end of which is provided with an end knob 40 outside the door, on the inner end of which is provided a plate 41 having outwardly extending pins 42 thereon which are adapted to extend into the holes 34 above-mentioned. When the door is open, as shown in Fig. 3, the pins are withdrawn from the holes, but in this case the end knob 32 within the casing can be operated to move the shaft 17. When the door is closed, the pins 42 enter the holes 34 thus permitting the turning of knob 43 from outside the door to operate the shaft 17. In this manner, therefore, the framing shaft can be operated whether the door is open or closed, and the proper connection for operating it from without the casing is automatically made as the door is closed.

The left end of shaft 17 is journalled in a hub 43 on wall or portion 10 and is provided with a suitable packing material 44 held in place by plate 45. The end knob 46 is disposed on this end of shaft 17. This knob is provided with a slot 47 to receive a screw 48 fastened to the shaft 17. This end of the shaft has on it a nut 49 between the inner shoulder of which and the adjacent face of the knob 46 is disposed a spring 50. Between the end face of the knob 46 and the plate 45 is disposed a washer 51. Adjacent the inner end of hub 43 there is disposed a collar 52 fastened to shaft 17 by a pin 53.

In the operation of the device it will be assumed that the parts are in the position shown in Fig. 2, with the door 12 closed. In this position the two brake disks 20 and 24 are engaged and, therefore, the gear 15 can not be turned by turning the shaft 17. If it is desired to operate the shaft 17 from outside the door 12, when the door is closed then the knob 40 is turned the desired amount. With the door closed the pins 42 engage in the holes 34 and turning of knob 40 is thereby effective to turn the shaft 17. Whether the shaft 17 is turned directly or through the intermediary of the auxiliary shaft, its direction of the initial turn will cause the pin 31 to ride up on the bevelled slot of notch 30 and slide the sleeve 16 to the left whereby the brake disks are disengaged. This disengagement takes place before the pin is out of the notch and further movement will cause the turning of gear 15 to effect the framing. As soon as the hand is released from the shaft, the spring 18 will restore the brake engagement and establish the normal relation of the pin and notch.

If it is desired to open the door 12, it is swung open as shown in Fig. 3 and the operation of shaft 17 can then be effected by turning knob 32. If it is desired to operate the shaft 17 from the left hand side of the projector casing outside the wall or partition 10 then the knob 46 is turned and the same action, as above described then takes place.

It is, therefore, apparent that this device is simple, efficient, compact and rugged. It maintains the shaft, preferably a framing shaft, in a normal adjusted position by means of an automatically engageable brake. This brake is automatically disengageable upon the initiation of any turning movement of the shaft in either direction. The provision of an auxiliary shaft on the door which may be pivoted or movable in any other suitable manner permits the shaft within the casing to be operated from outside the casing.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In a motion picture apparatus, a framing shaft, a casing within which said shaft is disposed, an intermittent mechanism, gearing on the shaft associated with gearing on the mechanism, a brake member slidable along the shaft and carrying said gearing on the shaft, a brake member on the casing, said members being normally engaged and means on the shaft operable upon initiation of a turning motion in the shaft to disengage said brake members whereby the shaft may be further turned.

2. In a motion picture apparatus, a framing shaft, a casing within which said shaft is disposed, an intermittent mechanism, gearing on the shaft associated with gearing on the mechanism, a brake member slidable along the shaft, a brake member on the casing, said brake members being normally engaged, and means on the shaft operable upon a turning motion in the shaft to slide the movable brake member along the shaft whereby the shaft may be further turned, and means for restoring the brake members to normal position when the hand is removed from turning the shaft.

3. In a motion picture apparatus a casing, a framing shaft disposed therein and mounted thereon, an intermittent mechanism within said casing, a gear on said mechanism, a sleeve slidable on the shaft, a gear on said sleeve engaging with the gear on said mechanism, a brake member on said sleeve, a brake member fixed to said casing, means on the shaft normally tending to cause engagement of said brake members, and means on the shaft engaging the sleeve to move it to disengage the brake member when the shaft is initially turned.

4. In combination a casing of a motion picture projector, a framing shaft disposed therein and mounted thereon for rotation, an intermittent mechanism within the casing, means on the shaft when turned to turn said mechanism in the framing apparatus, means for holding the shaft in an angularly adjusted position, means on each end of said shaft for turning it, one of said means disposed outside the casing and the other disposed inside the casing, a pivoted door on said casing, an auxiliary shaft on said door and extending therethrough, means on the inner end of said auxiliary shaft to engage the framing shaft when the door is closed to permit the turning of the auxiliary shaft to turn the framing shaft.

5. In a motion picture projector a shaft, a framing shaft disposed therein and mounted thereon, an intermittent mechanism within the casing, a gear on said mechanism, a slidable sleeve on said shaft, a gear on said sleeve engaging the gear on said mechanism, a brake member on the said sleeve, a cooperating brake member on the casing, means tending to hold said brake members in engagement, a notch in said sleeve and having bevelled walls, a pin on said shaft adapted to lie in said notch, means for disengaging the brake members as the shaft is initially moved, a door on said casing, an auxiliary shaft on said door and extending therethrough, interlocking pins and recesses on the adjacent ends of the framing and auxiliary shafts to, when the door is closed permit the operation of the framing shaft from outside the casing.

6. In combination a casing of a motion picture projector, a framing shaft disposed therein and mounted thereon, a framing box within the casing, a gear thereon, a sleeve slidable on the shaft, a gear on said sleeve engaging with the gear on said box, said sleeve having a notch therein with bevelled walls, a pin on the shaft adapted to lie in said notch, a brake member fixed in the casing, a brake member fastened to the sleeve, means on the shaft engaging the sleeve to hold said brake members in engagement whereby the shaft and the sleeve are held in an angularly adjusted position, and means for disengaging said brake members as the shaft is initially turned.

7. In combination a casing of a motion picture projector, a framing shaft disposed therein and mounted thereon, a framing box within the casing, a gear thereon, a sleeve slidable on the shaft, a gear on said sleeve engaging with the gear on said box, said sleeve having a notch therein with bevelled walls, a pin on the shaft adapted to lie in said notch, a brake member fixed in the casing, a brake member fastened to the sleeve, means on the shaft engaging the sleeve to hold said brake members in engagement whereby the shaft and the sleeve are held in an angularly adjusted position, and means for disengaging said brake members as the shaft is initially turned, a door on said casing, an axial shaft on said door and extending therethrough, and means on the framing shaft when the door is closed to permit the auxiliary shaft when turned to operate the framing shaft.

ALBERT KINDELMANN.
EWALD BOECKING.